US006999068B2

(12) United States Patent
Sobol

(10) Patent No.: US 6,999,068 B2
(45) Date of Patent: Feb. 14, 2006

(54) SYSTEM AND METHOD FOR ENABLING USERS TO EDIT GRAPHICAL IMAGES

(75) Inventor: Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 09/934,041

(22) Filed: Aug. 21, 2001

(65) Prior Publication Data

US 2003/0038832 A1 Feb. 27, 2003

(51) Int. Cl.
*G06T 15/00* (2006.01)
(52) U.S. Cl. .................. 345/418; 717/111; 717/113
(58) Field of Classification Search ............ 345/418, 345/419, 619, 589, 591, 593; 717/110, 111, 717/113
See application file for complete search history.

(56) References Cited

U.S. PATENT DOCUMENTS

| 5,129,013 A | | 7/1992 | Holzmann et al. ............ 382/44 |
| 5,603,034 A | * | 2/1997 | Swanson .................... 717/111 |
| 6,344,907 B1 | | 2/2002 | Watanabe et al. ........... 358/448 |
| 6,654,509 B1 | * | 11/2003 | Nishikawa et al. ......... 382/298 |

FOREIGN PATENT DOCUMENTS

JP 11045332 A 2/1999

OTHER PUBLICATIONS

"Adobe Photoshop 5.0 User Guide," Adobe Photoshop 5.0 User Guide for MacIntosh and Windows, 1998, pp. 129-130 and 301-302.
Screen-Shots und Auszüge aus der Hilfe-Datei: "Bildfarbe korrigieren und anpassen", von Corel Photo-Paint(TM) 8, Copyright 1988-1998, 5 sheets; HB.
CorelDraw (TM) 7, Das Kompendium, Markt&Technik, 1999, ISBN 3-8272-5477-9, pp. 564, 565,684,685; HB.

* cited by examiner

*Primary Examiner*—Phu K. Nguyen

(57) ABSTRACT

A graphical system enables users to edit graphical images. The graphical system utilizes memory for storing graphical data and an image manager. The image manager is configured to render a first set of the graphical data based on a first setting of an editing parameter. The first graphical data set defines a first image. The image manager is also configured to render a second set of the graphical data based on a second setting of the editing parameter in response to a user input and to render a third set of the graphical data based on a third setting of the editing parameter in response to the user input. The second setting is different than the third setting thereby enabling a user to comprehend, by visually comparing an image defined by the second graphical data set to an image defined by the third graphical data set, an effect of updating the editing parameter for the first image.

53 Claims, 8 Drawing Sheets

SYSTEM AND METHOD FOR ENABLING USERS TO EDIT GRAPHICAL IMAGES

BACKGROUND OF THE INVENTION

1. Field of the Invention

The present invention generally relates to graphical imaging techniques and, in particular, to a system and method for enabling users to edit rendered graphical images.

2. Related Art

There are various devices (e.g., digital cameras, computer systems, etc.) that render images. These devices usually allow users to edit the rendered images by allowing the users to adjust certain editing parameters of the images being rendered. For example, a user is often allowed to provide inputs to control an image's color vividness, brightness, contrast, and/or other types of editing parameters.

Many users are, unfortunately, unfamiliar with the effects of changing many of the controllable editing parameters. Thus, a user may desire to improve the appearance of a rendered image but may be uncertain as to which of the editing parameters should be changed in order to achieve the desired effect. In such a case, the user may change one or more of the editing parameters via trial-and-error, observing the image to see if the image's appearance is more or less desirable. The user may then continue adjusting different editing parameters in an attempt to improve the appearance of the observed image.

It may take several iterations of editing parameter adjustments in order for the user to be satisfied with the appearance of the rendered image. In some instances, the user may be unable to set the editing parameters appropriately to achieve a desired effect. Thus, the process of adjusting the editing parameters can be a difficult and tedious task for many users, especially for users who are relatively unfamiliar with the effects of changing one or more of the editing parameters. Indeed, many users who are relatively unfamiliar with the effects of changing the editing parameters often refrain from any attempts to manipulate the editing parameters due to the burdens pertaining to current image enhancement techniques. Even if such users attempt to change the editing parameters in order to improve the appearance of the rendered image, such users may quickly become frustrated with the trial-and-error process of changing the editing parameters and, therefore, may quickly abandon any such attempt.

Some attempts have been made to make it easier for users to control how images are rendered. For example, in one conventional graphics system, the system presents multiple thumbnail versions of the same image to a user. Each version is displayed with different editing parameters (e.g., different color vividness, brightness, contrast, etc.) such that each image appears different. The user then selects the thumbnail image most preferred by the user, and the editing parameters corresponding to the selected thumbnail image are then used to display a full-size version of the image.

Such a graphics system makes it easier for a user to control how images are rendered, but the graphics system does very little to help the user to customize an image. In this regard, the user's alternatives are limited to the displayed thumbnail images, and the user may prefer the final image to appear differently than any of the alternatives presented by the graphics system. In such a situation, the user either selects one of the less desirable thumbnail versions or attempts to manually control the system's editing parameters thereby encountering some of the same problems previously described.

SUMMARY OF THE INVENTION

Generally, the present invention provides a system and method for enabling users to edit graphical images.

In architecture, the system of the present invention utilizes memory for storing graphical data and an image manager. The image manager is configured to render a first set of the graphical data based on a first setting of an editing parameter. The first graphical data set defines a first image. The image manager is also configured to render a second set of the graphical data based on a second setting of the editing parameter in response to a user input and to render a third set of the graphical data based on a third setting of the editing parameter in response to the user input. The second setting is different than the third setting. By visually comparing an image defined by the second graphical data set to an image defined by the third graphical data set, a user can comprehend an effect of updating the editing parameter for the first image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention pertains to a system and method for enabling users to control editing parameters of graphical images. In this regard, a main image is rendered to a user via conventional techniques. Upon viewing the main image, the user may decide that the appearance of the main image should be changed. Thus, the user may decide to change the editing parameters of the rendered image in an attempt to edit or change the appearance of the main image in a desirable manner.

To help the user determine whether a particular editing parameter should be modified, two additional images are preferably displayed to the user. Preferably, these two additional images are substantially identical except that the particular editing parameter for one of the images is substantially different than the particular editing parameter for the other additional image. Therefore, by visually comparing the two additional images, the user is able to visualize quickly the effect of changing the particular parameter for the main image. Thus, the user is able to quickly determine whether or not the appearance of the main image would be improved by changing the particular editing parameter for the main image. Accordingly, the user is able to make better and/or faster decisions as to which editing parameters for the main image should be modified, thereby simplifying the process of enhancing the main image.

Figure 1:
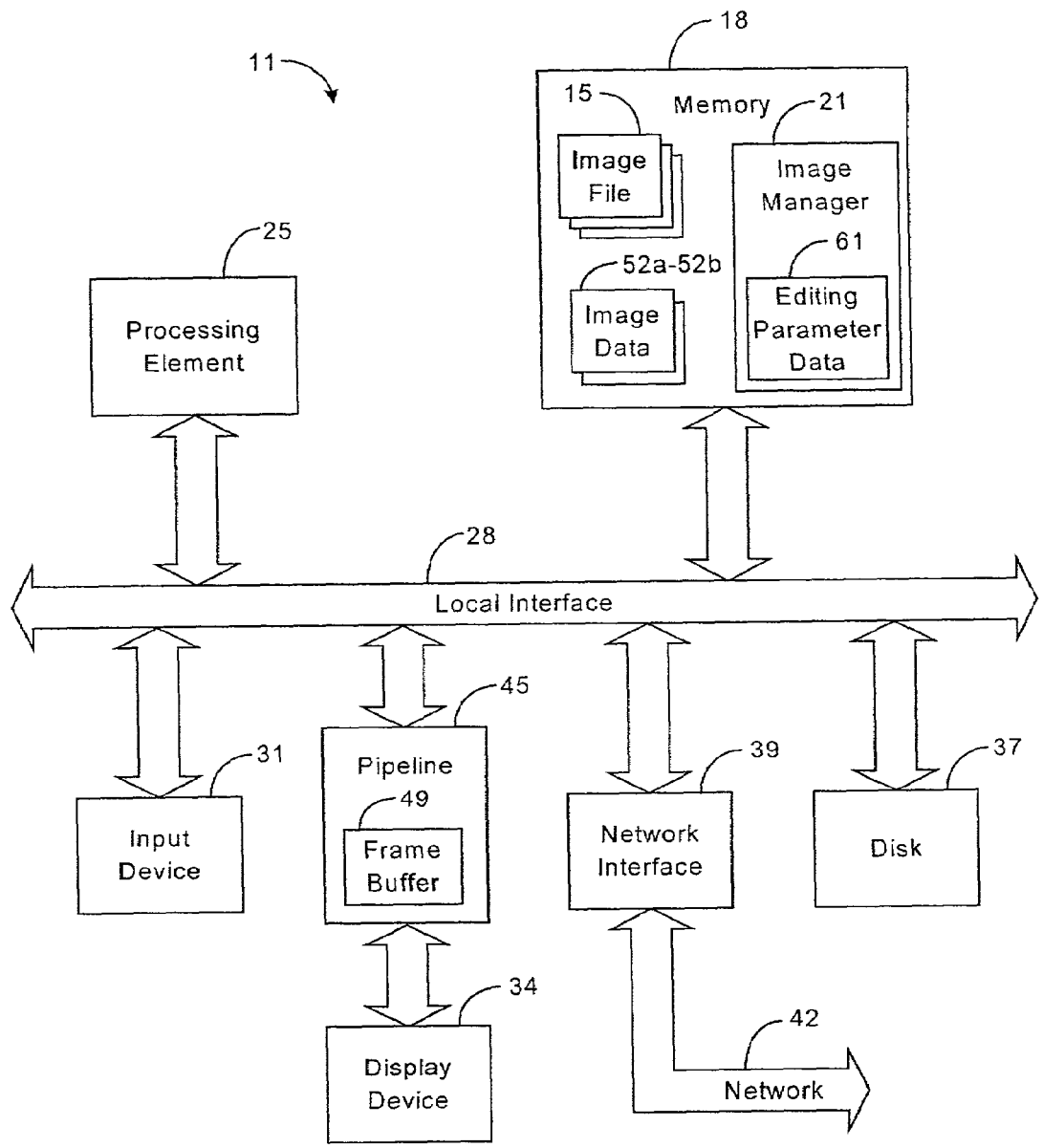
FIG. 1 is a block diagram illustrating a conventional image rendering system.

FIG. 1 depicts a conventional image rendering system 11. As shown by FIG. 1, the system 11 includes one or more image files 15 stored within memory 18. Each of the image files 15 includes graphical data that defines one or more images to be displayed by the system 11. The images defined by the image files 15 may be still-frame images (e.g., images individually captured by a digital camera, images individually created via a drawing program, etc.) and/or may be motion-frame images (e.g., images continuously recorded by a video recorder, images defined by an animation program, etc.).

The process of displaying an image is generally controlled by an image manager 21. The image manager 21 can be implemented in hardware, software, or a combination thereof. In the embodiment illustrated by FIG. 1, the image manager 21, along with its associated methodology, is implemented in software and stored within memory 18.

The computer system 11 of FIG. 1 comprises one or more conventional processing elements 25, such as a digital signal processor (DSP) or a central processing unit (CPU), that communicate to and drive the other elements within the system 11 via a local interface 28, which can include one or more buses. Furthermore, an input device 31, for example, a keyboard or a mouse, can be used to input data from a user of the system 11, and display device 34 can be used to output data to the user. A disk storage mechanism 37 can be connected to the local interface 28 to transfer data to and from a nonvolatile disk (e.g., magnetic, optical, etc.). The system 11 can be connected to a network interface 39 that allows the system 11 to exchange data with a network 42.

To display an image defined by one of the image files 15, the image manager 21 processes graphical data from the one image file 15 and transmits this graphical data to a graphical pipeline 45 that renders the graphical data to a frame buffer 49. More specifically, the image manager 21, based on the graphical data within the one image file 15, produces a set of image data 52a that defines the image to be displayed via display device 34. In producing the set of image data 52a, the image manager 21 may perform various transformation processes on the graphical data included within the foregoing image file 15. For example, the image manager 21 may adjust the pixel values of the graphical data from the image file 15 based on the resolution or size of the display device 34. Other types of transformation processes known in the art may be performed by the image manager 21.

After receiving the set of image data 52a, the pipeline 45 may be configured to perform other various transformation processes on the set of image data 52a. For example, the pipeline 45 may translate the pixel coordinates of the set of image data 52a into suitable screen coordinates that may be used by the display device 34, via well-known techniques, to appropriately color the pixels displayed by the display device 34. Other types of transformation processes known in the art may be performed by the graphical pipeline 45.

After appropriately processing the set of image data 52a, the graphical pipeline 45 stores the set of image data 52a into a frame buffer 49. The display device 34 then reads the transformed set of image data 52a stored within the frame buffer 49 and displays the image defined by this set of image data 52a to a user of the system 11. Note that the display device 34 may be any known device for displaying images such as, but not limited to, a liquid crystal display (LCD), a cathode ray tube, a printer, etc.

Figure 2:
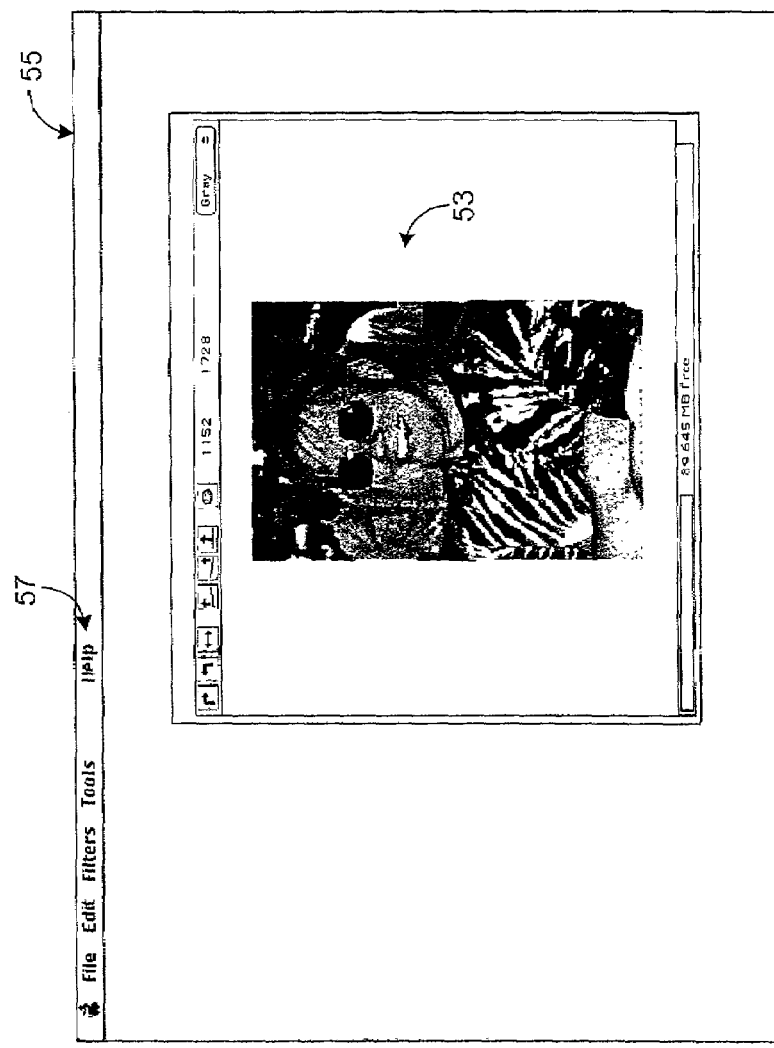
FIG. 2 is a diagram illustrating a graphical image displayed by the image rendering system of FIG. 1.

FIG. 2 depicts an exemplary image 53 that may be defined by the set of image data 52a and displayed by the display device 34. The image 53 of FIG. 2 is displayed within a window 55 that is also defined by data rendered to and stored within the frame buffer 49. Note that the techniques employed to generate a window, such as window 55, and to display a graphical image within the window are well-known in the art and will not be described in detail herein. Further, it is possible to display the image 53 without displaying window 55 or any other type of graphical user interface, if desired.

The window 55 of FIG. 2 includes various user selectable menu options 57, and the user may submit various inputs to the system 11 by selecting, via input device 31, one or more of the menu options 57. The user may also submit various inputs via other techniques, such as, for example, entering a particular character or a particular set of characters via a keyboard or keypad of the input device 31. There are various other well-known techniques for submitting inputs to electronic devices, such as image display system 11, and any known techniques for submitting inputs to electronic devices may be employed to provide the system 11 with one or more user inputs.

One of the inputs submitted by a user of the system 11 may be an input for changing an editing parameter pertaining to the image 53 being displayed by the system 11. In this regard, it is well known that the display of an image 53 is based on certain user selectable editing parameters in addition to the pixel data from an image file 15. These editing parameters typically affect the coloring or shading of each pixel of the image 52a, and unless changed by the user, these editing parameters typically remain constant. Normally, a default set of editing parameters are applied to each image rendered by the system 11. If the user desires to have a different set of editing parameters applied to a particular image, then the user usually must manually define, for the particular image, each editing parameter that is to be different than the default settings. Typical examples of such editing parameters include color vividness, brightness, contrast, etc.

Data defining such editing parameters is typically stored in memory 18 and is controlled by the image manager 21. This data will be referred to herein as editing parameter data 61. For each different set of image data, the editing parameter data 61 normally includes a value or set of values associated with each editing parameter defined by the data 61. For example, one of the editing parameters defined by the editing parameter data 61 may be brightness. Thus, the editing parameter data 61 may include a value or set of values, referred to as a "brightness setting," that indicates the desired brightness level of the associated graphical image. Another editing parameter defined by the editing parameter data 61 may be color vividness, and the editing parameter data 61 may include a value or set of values, referred to as a "color vividness setting," that indicates the desired color vividness level of the associated graphical image. Various other editing parameters may be similarly defined by the editing parameter data 61.

Normally, the image manager 21 mathematically combines each editing parameter setting for a particular set of image data 52a with each pixel color or shading value of the set of image data 52a according to a predefined algorithm, depending on the editing parameter. Techniques for modifying the pixel values of a set of image data 52a based on the editing parameter data 61 are generally well-known in the art.

If the user wishes to change the appearance of the image 53, the user may submit an input via input device 31 indicating a desire to change an editing parameter for the image 53. For example, the user may determine that the appearance of the image 53 may be enhanced by changing the color vividness of the image 53. In such an example, the user submits an input indicating a desire to change the color vividness of the image 53. In response, the image manager 21 typically renders some type of graphical user interface to assist the user in changing the color vividness of the image 53.

Figure 3:
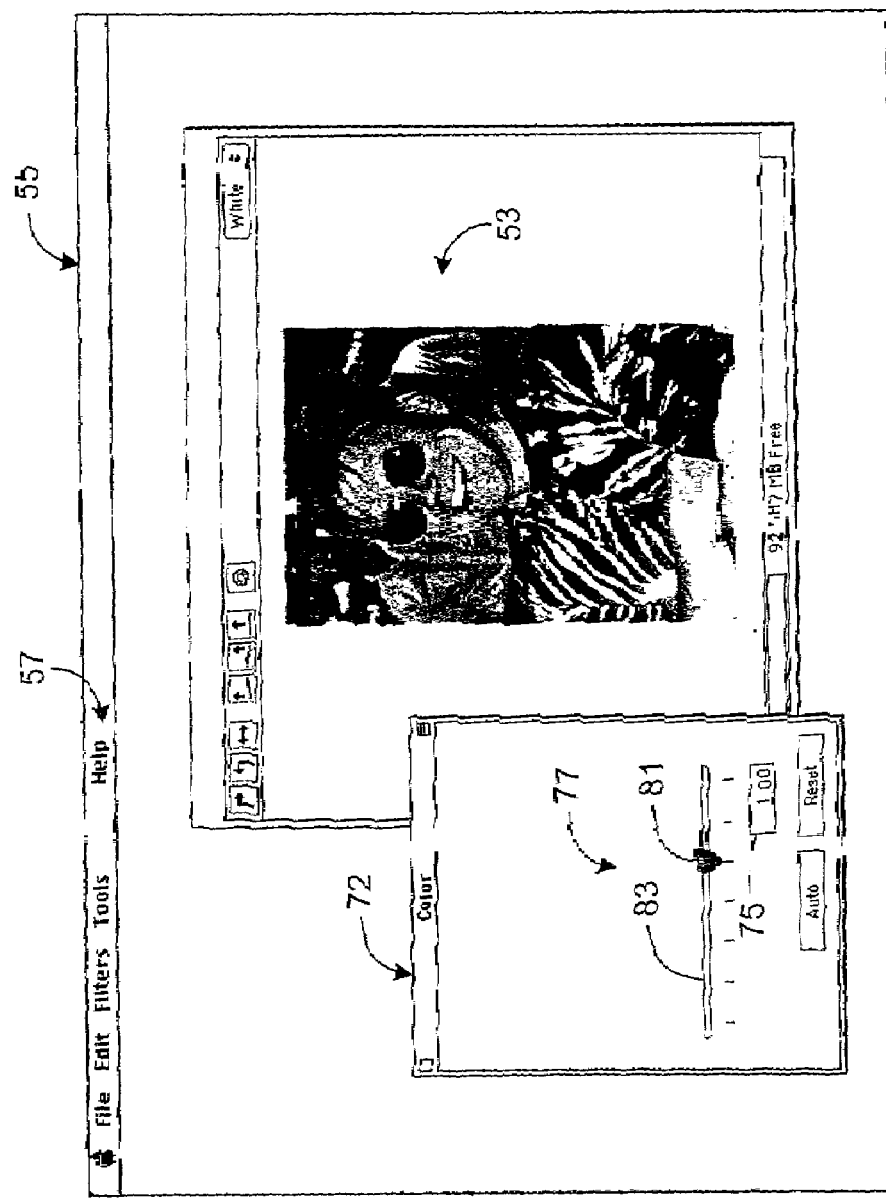
FIG. 3 is a diagram illustrating the graphical image of FIG. 2 once a user has submitted a request for changing an editing parameter of the graphical image.

For example, as shown by FIG. 3, the image manager 21 may render a window 72 and indicate, via this window 72, the current color vividness level. More specifically, the image manager 21 may include information in the window 72 indicative of the color vividness setting for the image 53. In the example shown by FIG. 3, the color vividness setting is represented numerically within an interface box 75 and is represented graphically via a slide bar 77.

The slide bar 77 includes a graphical positioning indicator 81, such as a graphical tab, for example, that moves along a path 83 based on the state of the editing parameter being represented by the slide bar 77. For example, in FIG. 3, the slide bar 77 is utilized to represent the color vividness setting, and the position of the positioning indicator 81 along the path 83 is indicative of the color vividness setting within editing parameter data 61 for image 53. In this regard, the positioning indicator 81 appears more to the left for lower levels of color vividness, and the positioning indicator 81 appears more to the right for higher levels of color vividness. Thus, the position of the positioning indicator 81 corresponds to and indicates the color vividness setting stored in the editing parameter data 61 for the image 53.

Upon viewing the window 72, the user may submit an input via input device 31 to change the color vividness of image 53 in a desired manner. For example, if the user desires to reduce the color vividness of image 53, the user may utilize a mouse to slide the positioning indicator 81 more to the left or may utilize a keyboard to lower the numerical value within the box 75. If the user desires to increase the color vividness of image 53, the user may utilize a mouse to slide the positioning indicator 81 more to the right or may utilize a keyboard to increase the numerical value within the box 75.

Based on the inputs entered by the user, the image manager 21 changes the color vividness setting within the editing parameter data 61 for the image 53. The image manager 21 then transforms the set of image data 52a (i.e., the data defining the displayed image 53) into a new set of image data 52b based on the new color vividness setting. Normally, this new set of image data 52b is identical to the original set of image data 52a, except that the newly defined color vividness setting is applied to the set of image data 52b instead of the previous color vividness setting that was applied to the original set of image data 52a.

The transformed set of image data 52b is then transmitted to pipeline 45 and rendered to frame buffer 49. The display device 34 then displays the data within the frame buffer 49, thereby updating the image 53 of FIG. 2 with a new image that is defined by the new set of image data 52b. Note that this new image may depict the same scene of the previous image 53 such that the only difference between the new image and the image 53 shown by FIG. 2 is the color vividness of the new image. Upon seeing the update to the image 53, the user may decide that further changes to the editing parameters are desirable and may change one or more of the editing parameters defined within the editing parameter data 61 according to techniques similar to those described above for changing the color vividness level.

Unfortunately, the user of the system 11 may become frustrated in trying to enhance the image 53, particularly if the user is unfamiliar with the effects of changing one or more of the editing parameters defined by the editing parameter data 61. Indeed, the user may refrain from even trying to enhance the image 53 because the user is unaware that changing the editing parameters would improve the image 53 or because the user believes that the burden of trying to change the editing parameters would be too great.

The present invention generally provides a system and method for enabling users to more easily and efficiently edit rendered images. By facilitating the process of editing the rendered images, users are encouraged to attempt image enhancement and should become more proficient in performing image enhancement.

Figure 4:
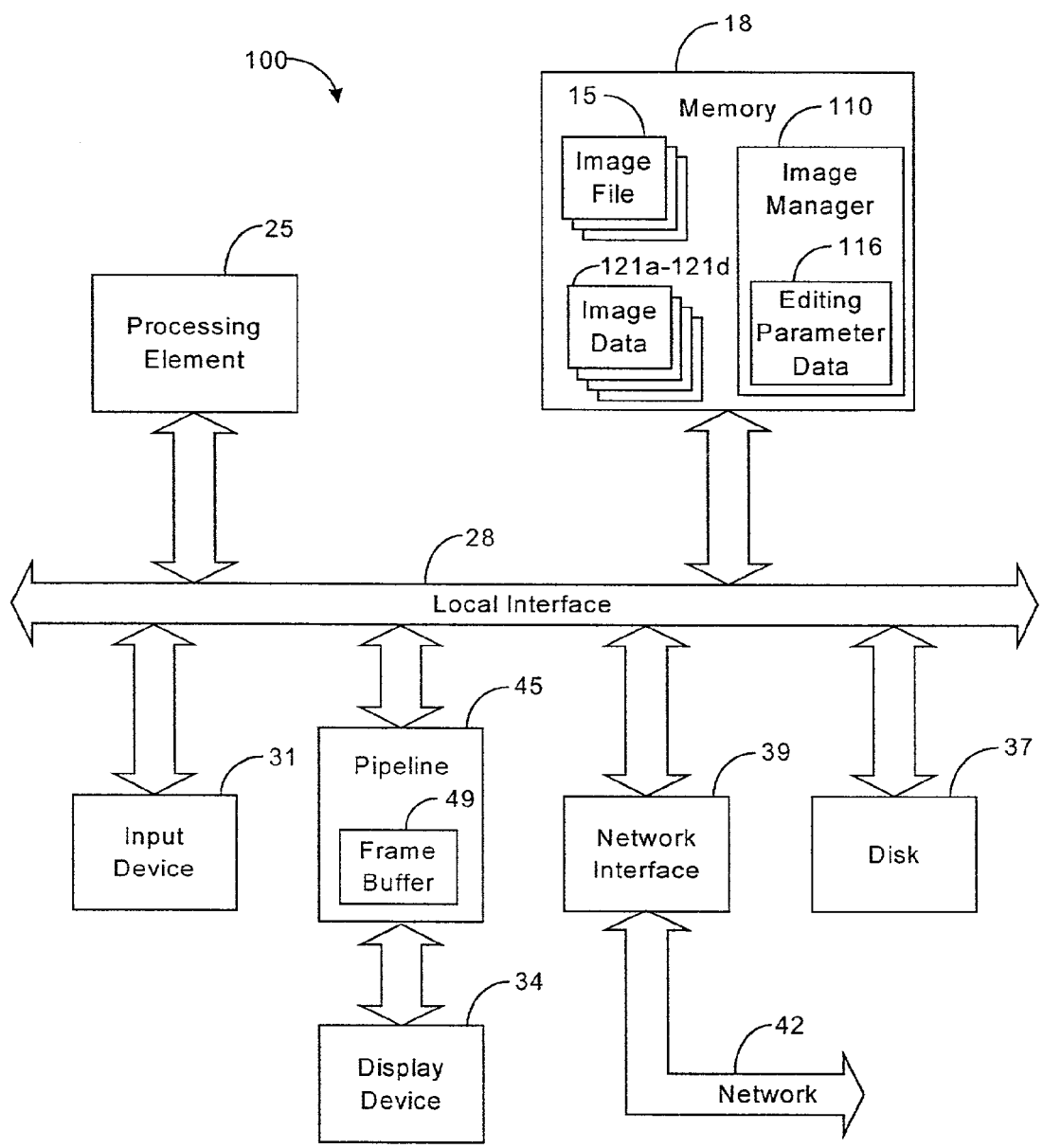
FIG. 4 is a block diagram illustrating an image rendering system in accordance with an exemplary embodiment of the present invention.

FIG. 4 depicts an image rendering system 100 capable of displaying and editing images in accordance with the present invention. The system 100 is configured to display an image to a user and to allow the user to control one or more editing parameters pertaining to the displayed image. The image rendering system 100 may be employed within a variety of products including, for example, cameras, computer systems, and/or other types of devices that display graphical images during operation.

As can be seen by comparing FIG. 1 to FIG. 4, the system 100 may be identical to conventional image rendering system 11 except that the system 100 includes an image manager 110 in accordance with the present invention in lieu of conventional image manager 21. The image manager 110 can be implemented in software, hardware, or a combination thereof. In the preferred embodiment, as illustrated by way of example in FIG. 4, the image manager 110 of the present invention, along with its associated methodology, is implemented in software and stored in memory 18.

Note that the image manager 110, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the image manager 110 may be magnetically stored and transported on a conventional portable computer diskette.

The image manager 110 preferably stores and controls editing parameter data 116, as shown by FIG. 4. The editing parameter data 116 may be identical to the editing parameter data 61 of conventional system 11 and, therefore, may include editing parameters or values pertaining to color vividness, brightness, contrast, etc.

The image manager 110 is preferably configured to display a graphical image according to the same techniques employed by conventional image manager 21. Therefore, to display graphical data from one of the image files 15, the image manager 110 preferably defines a set of image data 121a by performing various conventional transformation processes on graphical data from the one image file 15. One such transformation process may include applying the editing parameters defined by the editing parameter data 116 to pixel data read from the image file 15.

Figure 5:
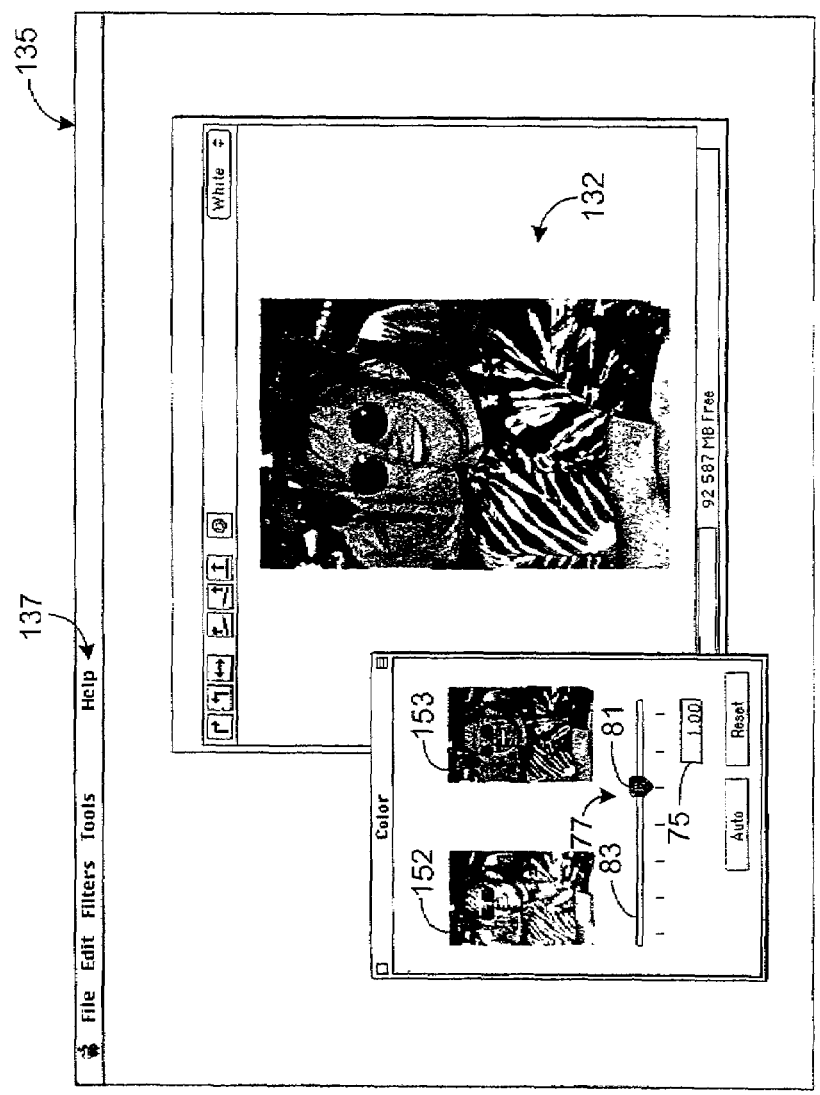
FIG. 5 is a diagram illustrating a graphical image displayed by the image rendering system of FIG. 4.

The image manager 110 may then transmit the set of image data 121a to the pipeline 45, which renders the set of image data 121a to the frame buffer 49. The display device 34 then reads the frame buffer 49 and displays the image defined by the set of image data 121a. FIG. 5 depicts such an image 132. As can be seen by comparing FIG. 5 to FIG. 2, the image 132 rendered by system 100 may be identical to the image 53 rendered by conventional system 11. Further, the image 132 may be displayed within a window 135 having various menu options 137, similar to the image 53 and window 55 of conventional system 11.

Upon seeing the image 132, the user of the system 100 may decide to enhance the image 132 by controlling certain editing parameters (e.g., color vividness, brightness, contrast, etc.). Thus, the user may submit an input via input device 31 indicating a desire to edit image 132. In response, the image manager 110 preferably displays a graphical user interface, such as the window 142 shown by FIG. 5. The window 142, similar to window 72, may include various graphical tools, such as one or more interface boxes 75 and/or slide bars 77, for enabling the user to change one or more editing parameters (e.g., color vividness, brightness, contrast, etc.). Thus, via techniques similar to those previously described for conventional system 11, the user may change a particular editing parameter by utilizing the graphical tools of window 142 or via some other technique for submitting inputs to the system 100.

In contrast to conventional system 11, however, and to help the user understand the effects of changing the particular editing parameter, the image manager 110 of the present invention preferably displays at least two images 152 and 153 based on substantially different settings of a particular editing parameter. In this regard, the display settings of the particular editing parameter for the two images 152 and 153 should be sufficiently different such that a user can comprehend the effect of changing the particular editing parameter by comparing the images 152 and 153, as will be described in more detail hereinbelow. The difference between the display settings of the two images 152 and 153 may be small, but this may make it more difficult for the user to readily comprehend the effects of changing the particular display setting. Thus, in most cases, it is preferable for the difference in the two settings to be substantial so that the user can readily comprehend the effects of changing the particular editing parameter. Indeed, in the preferred embodiment, one of the images 152 or 153 is based on a setting that is at or close to the low end of the setting range, and the other of the images 152 or 153 is based on a setting that is at or close to the high end of the setting range.

Further, when a slide bar 77 is utilized to change the particular display setting, it may be desirable to position the images 152 and 153 in relation to the slide bar 77 such that the positions of the images 152 and 153 indicate the approximate slide bar path locations for the settings of editing parameters for images 152 and 153, respectively. For example, the position of the image 152 may correspond to (e.g., be close to or aligned with) the location along the path 83 where the positioning indicator 81 would be located if the positioning indicator 81 was indicating the setting of the particular editing parameter for the image 152. Further, the position of the image 153 may correspond to (e.g., be close to or aligned with) the location along the path 83 where the positioning indicator 81 would be located if the positioning indicator 81 was indicating the setting of the particular editing parameter for the image 153. The positioning of the images 152 and 153 for the preferred embodiment will be described in more detail hereafter.

Preferably, the two images 152 and 153 are derived from the same set of image data 121a or from the same image file 15 as image 132 and are identical to image 132 except for perhaps the sizes of the images 152 and 153 and except for the particular editing parameter that is being changed by the user. Note that it is possible for the particular editing parameter for one of the images 152 or 153 to be identical to or match the particular editing parameter for image 132. Further, except for the particular editing parameter, the two images 152 and 153 are preferably identical to each other. As a result, the user can visually compare the two images 152 and 153 to easily understand how manipulation of the particular editing parameter will effect the images rendered by the system 100 and, more specifically, the image 132.

For example, the images 152 and 153 of FIG. 5 are smaller images of image 132 and have been rendered with substantially different color vividness settings. More specifically, image 152 has been rendered utilizing a relatively low setting for color vividness, and image 153 has been rendered utilizing a relatively high setting for color vividness. Thus, as shown by FIG. 5, image 152 appears to have low color vividness (similar to a "black and white" image), while image 153 appears to have high color vividness. By visually comparing the images 152 and 153, a user can readily identify and comprehend how images and, more specifically, how image 132 are affected by manipulating the particular editing parameter, which in this case pertains to color vividness.

In order to display images 152 and 153, the image manager 121 produces two new sets of image data 121b and 121c. These new sets of image data 121b and 121c are preferably identical to the set of image data 121a used to define image 132 except that the image manager 110: (1) applies a substantially different setting for the particular editing parameter to at least one of the new sets of image 121b and 121c and (2) transforms the sets of image data 121b and 121c such that they define smaller images located within window 72. Note that the new sets of image data 121b and 121c can be copied or otherwise derived from the same image file 15 used to define the set of image data 121a or can be copied or otherwise derived from the set of image data 121a directly. The image manager 110 transmits the new sets of image data 121b and 121c to the pipeline 45, which renders this data to the frame buffer 49. The display device 34 then displays the new sets of image data 121b and 121c as images 152 and 153, respectively.

In the preferred embodiment, the images 152 and 153 are positioned adjacent to opposite ends of the path 83. The images 152 and 153 are preferably positioned such that the user can better determine the effect of moving the positioning indicator 81 toward one of the ends of the path 83 when visually comparing the images 152 and 153. In this regard, the setting of the particular editing parameter for image 152 preferably corresponds to a location along the path 83 that is close to the path end adjacent to image 152. Thus, if the image manager 110 positions the positioning indicator 81 along the path 83 to indicate the particular editing parameter setting for image 152, then the image manager 110 would locate the positioning indicator 81 close to the path end that is adjacent to image 152. Further, the setting of the particular editing parameter for image 153 preferably corresponds to a location along the path 83 that is close to the path end adjacent to image 153. Thus, if image manager 110 positioned the positioning indicator 81 along the path 83 to indicate the particular editing parameter setting for image 153, then the image manager 110 would locate the positioning indicator 81 close to the path end that is adjacent to image 153.

Therefore, if the user moves the positioning indicator 81 along the path 83 toward the path end adjacent to image 152, then the image 132 should be updated by the image manager 110 to more closely resemble the particular editing parameter of image 152. Conversely, if the user moves the positioning indicator 81 along the path 83 toward the path end adjacent to image 153, then the image 132 should be updated by the image manager 110 to more closely resemble the particular editing parameter of image 153. Thus, in the preferred embodiment, the positioning of images 152 and 153 should help the user to better comprehend the effect of changing the particular editing parameter setting via the positioning indicator 81.

After comparing the images 152 and 153, the user may decide that the image 132 would be enhanced by changing the particular editing parameter of the image 132 and, therefore, may submit an input to change the particular editing parameter. Once this occurs, the image manager 110 updates the editing parameter data 116 such that the setting of the particular editing parameter for image 132 is changed according to the user input. The image manager 110 then produces a new set of image data 121d for updating the image 132. In this regard, this new set of image data 121d is preferably identical to the set of image data 121a originally used to define image 132 except that the image manager 110 applies the particular editing parameter setting, as modified by the user, to the new set of image data 121d. Note that the new set of image data 121d can be copied or otherwise derived from the same image file 15 used to define the set of image data 121a or can be copied or otherwise derived from the set of image data 121a directly.

The image manager 110 transmits the new set of image data 121d to the pipeline 45, which renders this data to the frame buffer 49. The display device 34 then displays the new set of image data 121d. More specifically, the display device 34 replaces image 132 with the image defined by the new set of image data 121d. At this point, the user observes a new version of image 132, in which the particular editing parameter of the new version has been changed according to the user's previous inputs. If the new version of image 132 is still not suitable to the user, then the user can make further changes to the same or other editing parameters in an effort to enhance the image 132.

Figure 6:
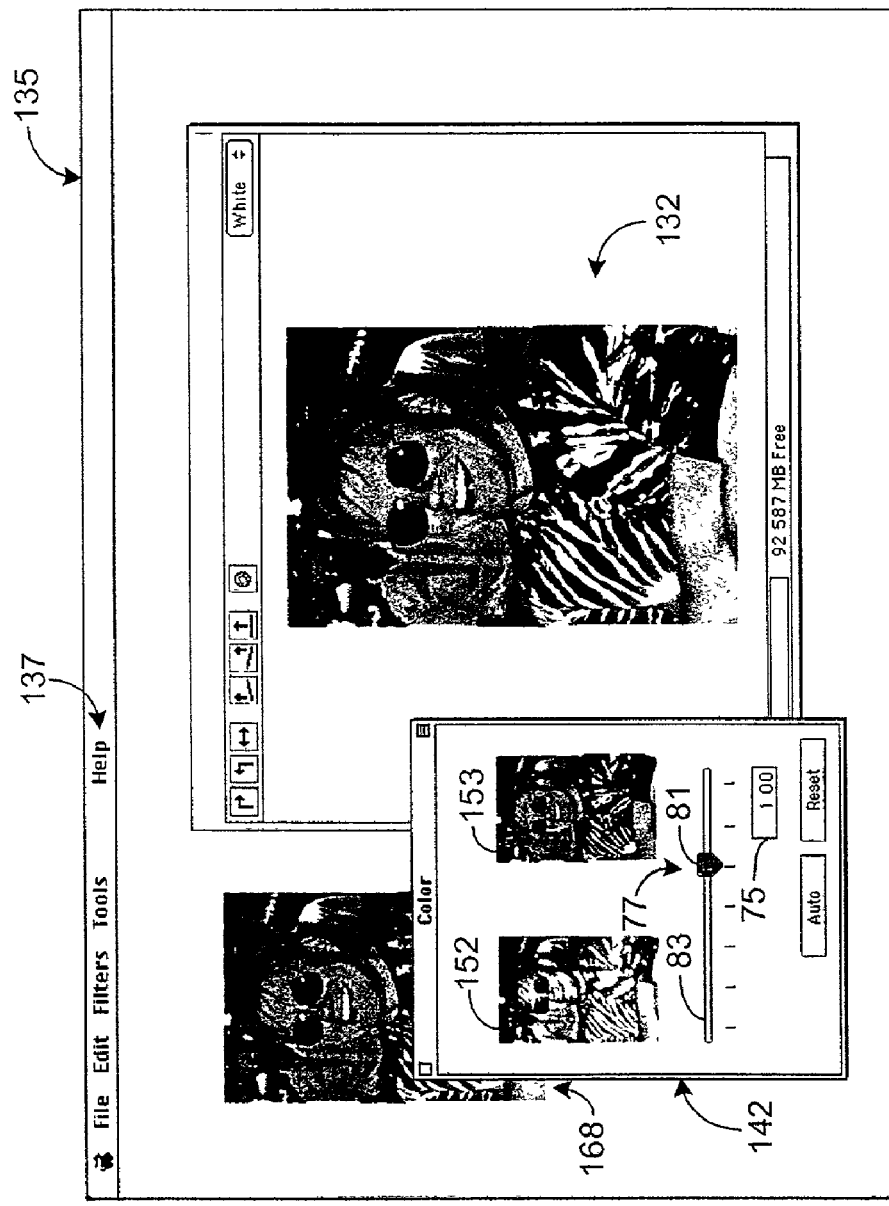
FIG. 6 is a diagram illustrating the graphical image of FIG. 5 after the user has submitted an input for changing an editing parameter of the graphical image.

It should be noted that before updating the image 132 based on the particular editing parameter, as modified by the user, another image may be first updated with the user modified editing parameter. In this regard, when the user submits an input indicating a desire to change a particular editing parameter, the window 142 is preferably displayed, as described above. However, in addition to the two images 152 and 153, a third image 168 (FIG. 6) may be displayed via techniques similar to those used to display images 152 and 153. This image 168 may be identical to the image 132 except perhaps for the size of the image 168. Further, the foregoing image 168 may be displayed within window 142 (e.g., between images 152 and 153) or, alternatively, outside of window 142, as shown by FIG. 6.

When the user submits an input for changing the particular editing parameter, the setting of the particular editing parameter, as modified by the user, may be applied to image 168 before applying it to image 132. Thus, the image 168 may be updated based on the particular editing parameter, as modified by the user, via techniques similar to those described previously for updating image 132. Accordingly, the user is able to observe the effect of modifying the particular editing parameter before the user's change to the particular editing parameter is applied to image 132.

If the user determines that changing the particular editing parameter is desirable based on his or her observation of the update to image 168, then the user may submit an input indicating that the particular editing parameter of image 132 should be similarly changed. In response, the image 132 is updated based on the user's change to the particular editing parameter via the techniques previously described hereinabove. However, if the user determines that changing the particular editing parameter did not enhance image 168, then the user may refrain from submitting the foregoing input to system 100. As a result, the image 132 is not modified based on the user's previous inputs for changing the particular editing parameter.

Moreover, the foregoing process of updating image 168 before image 132 could be implemented each time the user requests modification of one of the editing parameters. Thus, only the editing parameter changes approved by the user after observing the effects of the changes to image 168 are actually applied to the image 132, thereby helping the user to refrain from modifying the image 132 in an undesirable way.

It should be noted that the use of graphical user interfaces is not a necessary feature of the present invention. In this regard, it is not necessary to display any of the images 132, 152, 153, and/or 168 within one or more graphical user interfaces, and it is not necessary to display the information conveyed by window 142 in a graphical user interface that is separate from the graphical user interface of images 132 and/or 168.

It should also be noted that each of images 132, 152, 153, and 168 have been described in the preferred embodiment as identical except for different sizes and substantially different settings for a particular editing parameter. In other words, each image 132, 152, 153, and 168 depicts the same scene but has a different size and/or a different editing parameter (e.g., color vividness, brightness, contrast, etc.). It should be noted that in other embodiments, the different images 132, 152, 153, and/or 168 can define different scenes or be otherwise distinguishable. However, defining different scenes with the images 132, 152, 153, and/or 168 may make it more difficult for the user to comprehend the effects of changing the particular editing parameter.

In addition, it is not necessary for the path 83 to be linear, and indicators, other than the tab of FIG. 3, may be utilized to implement positioning indicator 81. In this regard, the path 83 can be of any shape, and any known indicator for identifying a location along the path 83 can be utilized to implement the positioning indicator 81.

Figure 7:
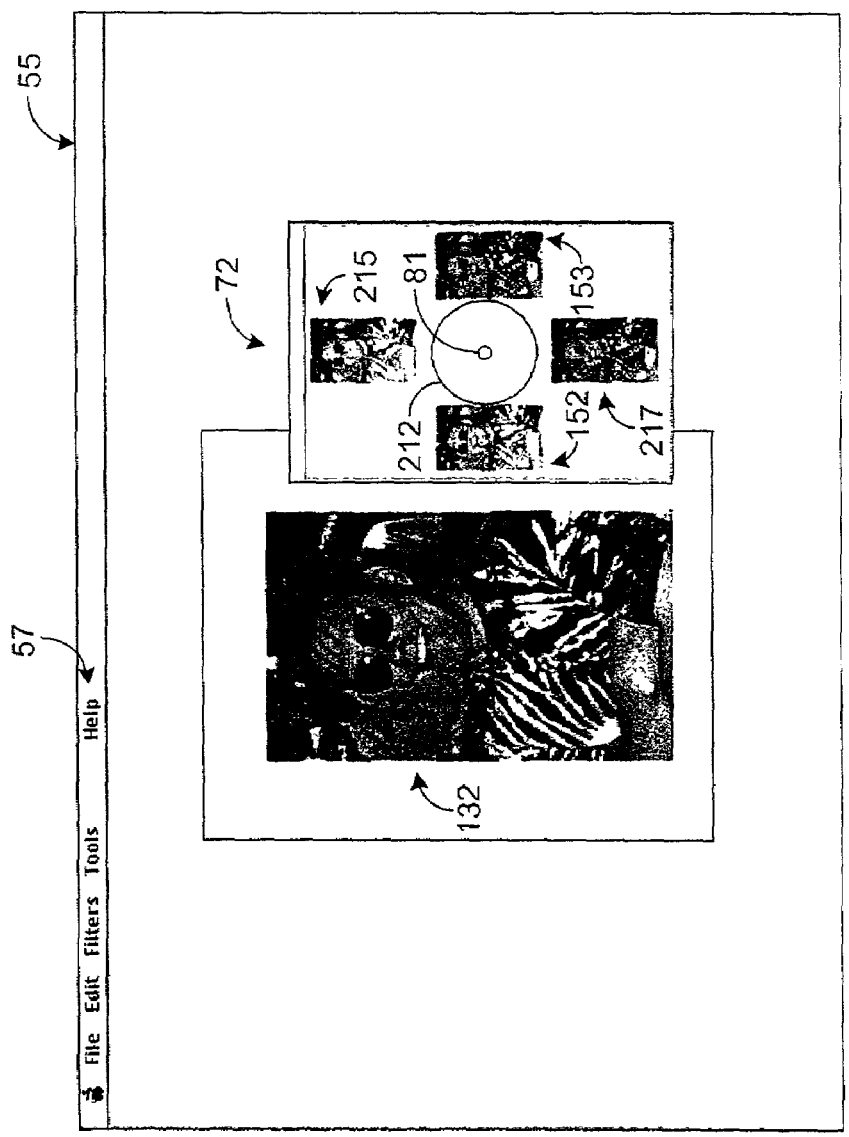
FIG. 7 is a diagram illustrating a graphical image displayed by an image rendering system in accordance with another embodiment of the present invention.

Further, it is possible to include graphical tools for changing the settings of multiple editing parameters within the window 72. For example, the window 72 may include one or more other slide bars 77 that enable the user to change other editing parameters. It is also possible to move positioning indicator 81 in another direction for changing another editing parameter. For example, FIG. 7 depicts a positioning indicator 81 that may be moved in a two-dimensional range of motion within area 212. Images 152 and 153 are based on substantially different settings of a first editing parameter, as described above, and images 215 and 217 are based on substantially different settings of a second editing parameter.

When the positioning indicator 81 is moved closer to one of the images 152 or 153, then the setting of the first editing parameter for image 132 is updated to more closely resemble the setting of the first editing parameter for the one image 152 or 153, as described above. Similarly, when the positioning indicator 81 is moved closer to one of the images 215 or 217, then the setting of the second editing parameter for image 132 is updated to more closely resemble the setting of the second editing parameter for the one image 215 or 217. Thus, the positioning indicator 81 may be utilized to update different editing parameters, and by visually comparing the images 152, 153, 255, and 257, the user may readily comprehend the effects that moving the positioning indicator 81 may have on each of the different editing parameters. Note that the techniques previously described for rendering images 152 and 153 may be employed for rendering images 215 and 217.

Figure 8:
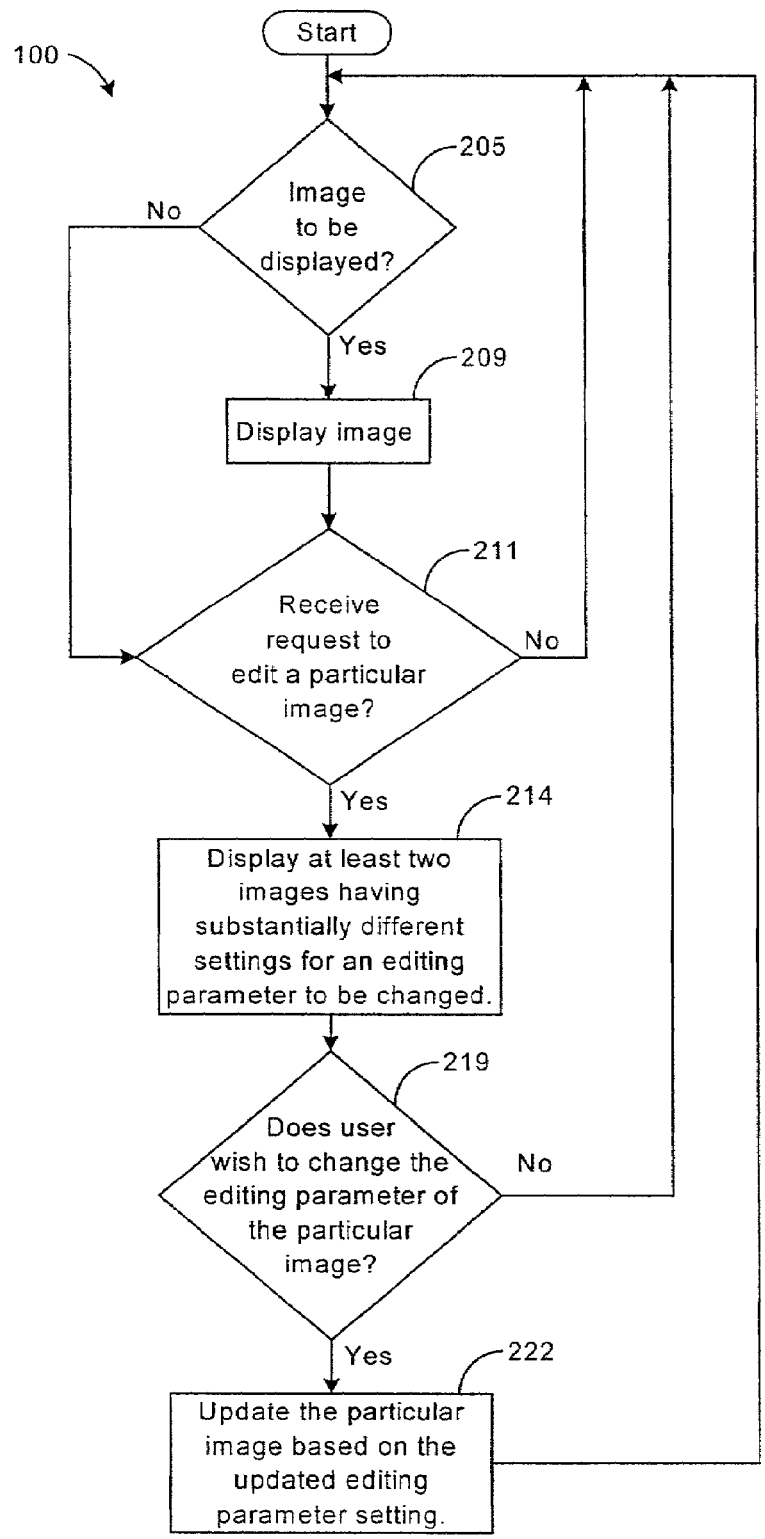
FIG. 8 is a flow chart illustrating an architecture and functionality of the system depicted in FIG. 4.

The preferred use and operation of the image rendering system 100 and associated methodology are described hereafter with particular reference to FIG. 8.

The image manager 110, during normal operation, renders various images in performing blocks 205 and 209. For illustrative purposes, assume that the image manager 110 renders, in block 209, a set of image data 121*a* defining image 132. Thus, in performing block 209, the image manager 110 transmits the foregoing set of image data 121*a* to pipeline 45, which renders the set of image data 121*a* to frame buffer 49. Based on the data within the frame buffer 49, the display device 34 then displays image 132.

Upon seeing the image 132, assume that the user decides to enhance the image 132 by changing a particular editing parameter (e.g., the color vividness) of the image 132. In this example, the user submits, via input device 31, an input indicating a desire to edit the image 132. The image manager 110 detects this input in block 211, and in response, displays at least images 152 and 153 in block 214. Images 152 and 153 preferably define the same scene as image 132, and the setting of an editing parameter of image 152 is preferably substantially different (e.g., substantially lower) than the setting for the same editing parameter of image 153. For example, assume that the images 152 and 153 define the same scene, and assume that the color vividness level of image 152 is substantially lower than the color vividness level of image 153. By visually comparing image 152 to 153, the user should be able to comprehend easily the effect of changing the color vividness of image 132, and the user, therefore, should be able to decide easily whether or not he or she would like to change the color vividness of image 132.

Assuming that the user decides to enhance the image 132 by modifying the color vividness of the image 132, the user then submits an input to the system 100 indicating to what degree the color vividness of the image 132 should change. In the preferred embodiment, the user moves the positioning indicator 81 of the color vividness slide bar 77 to a position that corresponds to the desired color vividness setting. For example, assume that user would like the color vividness of image 132 to more closely resemble the color vividness of image 152 instead of the color vividness of image 153. Thus, in the preferred embodiment, the user moves the positioning indicator 81 to a position that is closer to the path end adjacent to image 152 than to the path end adjacent to image 153. In other words, the user moves the positioning indicator 81 closer to image 152. Since the color vividness setting of image 152 corresponds to a location at or close to the path end adjacent to image 152, the closer that the user moves the positioning indicator 81 to image 152, the more that the color vividness of the update to image 132 (which will be described in further detail below) will resemble the color vividness of image 152. This feature makes the manipulation of the indicator's position more intuitive for the user.

In response to the user's movement of the positioning indicator 81, the image manager 110 updates the image 132 based on the moved position of the indicator 81, as shown by blocks 219 and 222. More specifically, the image manager 110 produces a set of image data 121*d* that preferably defines the same scene as depicted via image 132. The image manager 110 then applies a different color vividness setting to the new set of image data 121*d* based on the moved position of the positioning indicator 81. More specifically, the color vividness setting applied to the new set of image data 121*d* is the color vividness setting that corresponds to the location of the positioning indicator 81, as just moved by the user. Thus, the color vividness of the image defined by the new set of image data 121*d* should be different than the color vividness of the image 132.

In block 222, the image manager 110 transmits the new set of image data 121*d* to the pipeline 45, which renders the new set of image data to the frame buffer 49. The display device 34 then replaces the image 132 with the image defined by the new set of image data 121*d*, thereby updating the image 132. Since the user moved the indicator 81 toward image 152 in the present example, the color vividness of the updated image should more closely resemble the color vividness of image 152. The foregoing process can be repeated for the same or different editing parameters as often as desired in order to enhance the image 132 in a desired manner.

Note that, if desired, various other types of updates to the image 132 may be performed in block 222 along with the update to the color vividness. These updates may include updates to other editing parameters, updates of the scene depicted by image 132, and/or various other updates known in the art. Such updates may be incorporated into the same set of image data 121*d* that is utilized to update the image 132 for the color vividness setting defined by the user.

What is claimed is:

1. A system for enabling users to edit graphical images, comprising:

memory for storing graphical data; and an image manager configured to render a first set of said graphical data defining a first image based on a first setting of an editing parameter, said image manager configured to render a second set of said graphical data defining a second image based on a second setting of said editing parameter in response to a user input and to render a third set of said graphical data defining a third image based on a third setting of said editing parameter in response to said user input, said second setting different than said third setting thereby enabling a user to comprehend, by visually comparing said second and third images, an effect of updating said editing parameter for said first image, wherein said image manager is further configured to render a positioning indicator movable along a path, said second setting corresponding to a location along said path, wherein a position of said second image corresponds to said second setting location.

2. The system of claim 1, wherein said image manager is further configured to render data indicative of said first setting in response to said user input.

3. The system of claim 1, wherein said image manager is further configured to enable a user to define a fourth setting of said editing parameter and to render a fourth set of said graphical data based on said fourth setting, and wherein said fourth graphical data set defines an image that corresponds to said first image.

4. The system of claim 1, wherein each of said second and third images corresponds to said first image.

5. The system of claim 1, wherein said second and third settings are both different than said first setting.

6. The system of claim 1, wherein said image manager is further configured to render said positioning indicator in response to said user input, wherein said third setting corresponds to another location along said path, and wherein a position of said third image corresponds to said third setting location.

7. The system of claim 1, wherein said image manager is further configured to determine a new setting of said editing parameter for said first image based on a location of said positioning indicator.

8. The system of claim 7, wherein said positioning indicator is movable along a predefined path and wherein said image manager is configured to determine said new setting based on a location of said positioning indicator along said predefined path.

9. The system of claim 8, wherein said predefined path has at least one end and wherein said image manager is configured to determine said new setting based on a distance of said positioning indicator from said end.

10. The system of claim 7, wherein said positioning indicator comprises a tab.

11. The system of claim 7, wherein said image manager is configured to slide said positioning indicator along a path in response to a user input.

12. The system of claim 1, wherein said first user input selects said editing parameter.

13. The system of claim 1, wherein said image manager determines a new setting of said editing parameter for said first image based on a slide bar rendered by said image manager.

14. The system of claim 1, wherein said image manager is further configured to determine a new setting of said editing parameter for said first image based on another user input and to mathematically combine said new setting with pixel color values defining said first image.

15. The system of claim 1, wherein said editing parameter is a pixel color parameter.

16. A system for enabling users to edit graphical images, comprising:

memory for storing graphical data; and an image manager configured to render a first set of said graphical data defining a first image based on a first setting of an editing parameter, said image manager configured to render a second set of said graphical data defining a second image based on a second setting of said editing parameter in response to a user input and to render a third set of said graphical data defining a third image based on a third setting of said editing parameter in response to said user input, said second setting different than said third setting thereby enabling a user to comprehend, by visually comparing said second and third images, an effect of updating said editing parameter for said first image, wherein said image manager is further configured to render a positioning indicator movable along a path, said path having a first end and a second end, wherein said image manager is configured to position said second image adjacent to said first end, and wherein said image manager is further configured to position said third image adjacent to said second end.

17. The system of claim 16, wherein said image manager is configured to enable a user to define a fourth setting of said editing parameter and to render a fourth set of said graphical data based on said fourth setting, wherein said fourth graphical data set defines an image that corresponds to said first image, and wherein said image manager is further configured to control said fourth setting based on a user input of moving said positioning indicator toward one of said ends.

18. The system of claim 16, wherein said second setting corresponds to a location along said path that is closer to said first end than a location along said path that corresponds to said third setting.

19. The system of claim 16, wherein said editing parameter is a pixel color parameter.

20. A system for enabling users to edit graphical images, comprising:

memory for storing graphical data; and an image manager configured to render a first set of said graphical data defining a first image based on a first setting of an editing parameter, said image manager configured to render a second set of said graphical data defining a second image based on a second setting of said editing parameter in response to a user input and to render a third set of said graphical data defining a third image based on a third setting of said editing parameter in response to said user input, said second setting different than said third setting thereby enabling a user to comprehend, by visually comparing said second and third images, an effect of updating said editing parameter for said first image, wherein said image manager is configured to render a movable positioning indicator and determine a new setting of said editing parameter for said first image, based on a location of said positioning indicator, in response to a movement of said positioning indicator closer to said second image such that said new setting, as compared to said first setting, is closer to said second setting.

21. The system of claim 20, wherein said new setting is different than said second setting.

22. The system of claim 20, wherein said editing parameter is pixel color parameter.

23. A system for enabling users to edit graphical images, comprising:

memory for storing graphical data; and an image manager configured to render, within a first graphical window, a first set of said graphical data defining a first image based on a first setting of an editing parameter, said image manager further configured to receive a user input for selecting said editing parameter and to render a second graphical window in response to said user input, said second graphical window including a second image based on a second setting of said editing parameter and a third image based on a third setting of said editing parameter, said second setting different than said third setting thereby enabling a user to comprehend, by visually comparing said second image to said third image, an effect of updating said editing parameter for said first image, wherein said image manager is configured to render a movable positioning indicator within said second graphical window and to update said editing parameter for said first image based on a proximity of said positioning indicator relative to said second image.

24. A system for enabling users to edit graphical images, comprising:

memory for storing graphical data; and an image manager configured to render a first set of said graphical data defining a first image based on a first setting of an editing parameter for controlling image color and to enable a user to select among different editing parameters for controlling image color, said image manager further configured to render, in response to a user input for selecting at least one of said editing parameters, a second set of graphical data defining a second image based on a second setting of said editing parameter and a third set of graphical data defining a third image based on a third setting of said editing parameter, said second setting different than said third setting thereby enabling a user to comprehend, by visually comparing said second and third images, an effect of updating said editing parameter for said first image, wherein said first image is within a first graphical window, wherein said second and third images are within a second graphical window that is rendered by said image manager in response to said user input, and wherein said image manager is configured to render a movable positioning indicator within said second graphical window and to update said editing parameter for said first image based on a location of said positioning indicator.

25. The system of claim 24, wherein said image manager is further configured to determine a new setting of said editing parameter for said first image based on a user input and to mathematically combine said new setting with pixel color values defining said first image.

26. The system of claim 24, wherein said editing parameter is selected from a group consisting of: color vividness, color brightness, and contrast.

27. A system for enabling users to edit graphical images, comprising:

memory for storing graphical data; and an image manager configured to render, within a first graphical window, a first set of said graphical data defining a first image based on a first setting of an editing parameter, said image manager further configured to receive a user input for selecting said editing parameter and to render a second graphical window in response to said user input, said second graphical window including a second image based on a second setting of said editing parameter and a third image based on a third setting of said editing parameter, said second setting different than said third setting thereby enabling a user to comprehend, by visually comparing said second image to said third image, an effect of updating said editing parameter for said first image, wherein said second setting corresponds to a location along a path of a positioning indicator rendered by said image manager, and wherein a position of said second image corresponds to said second setting location.

28. The system of claim 1, wherein said image manager is configured to enable a user to define a fourth setting of said editing parameter, and wherein said image manager is further configured to update said first image based on said fourth setting.

29. The system of claim 27, wherein said second graphical window further includes data indicative of said first setting.

30. The system of claim 27, wherein each of said second and third images corresponds to said first image.

31. The system of claim 27, wherein said second graphical window includes said positioning indicator, wherein said third setting corresponds to another location along said path, and wherein a position of said third image corresponds to said third setting location.

32. The system of claim 27, wherein said path has a first end and a second end, wherein said second image is positioned adjacent to said first end, and wherein said third image is positioned adjacent to said second end.

33. The system of claim 32, wherein said image manger is configured to enable a user to define a fourth setting of said editing parameter, wherein said image manager is further configured to update said first image based on said fourth setting, and wherein said image manager is configured to control said fourth setting based on a user input of moving said positioning indicator toward one of said ends.

34. The system of claim 32, wherein said second setting corresponds to a location along said path that is closer to said first end than a location along said path that corresponds to said third setting.

35. The system of claim 27, wherein said image manager is configured to render a slide bar in said second graphical window.

36. The system of claim 27, wherein said image manager is further configured to determine a new setting of said editing parameter for said first image based on a user input and to mathematically combine said new setting with pixel color values defining said first image.

37. A method for enabling users to edit graphical images, comprising:

rendering a first set of graphical data based on a first setting of an editing parameter;

displaying a first image based on said rendered first graphical data set;

rendering, in response to a user input, a second set of said graphical data based on a second setting of said editing parameter;

displaying a second image based on said rendered second graphical data set;

rendering, in response to said user input, a third set of said graphical data based on a third setting of said editing parameter, said third setting different than said second setting;

displaying a third image based on said rendered third graphical data set thereby enabling a user to comprehend, by visually comparing said second image to said third image, an effect of updating said editing parameter for said first image;

rendering a positioning indicator movable along a path, wherein said second setting corresponds to a first location along said path; and positioning said second image at a location corresponding to said first location.

38. The method of claim 37, further comprising: enabling a user to define a fourth setting of said editing parameter; rendering a fourth set of said graphical data based on said fourth setting; and displaying a fourth image based on said rendered fourth graphical data set, said fourth image corresponding to said first image.

39. The method of claim 37, further comprising: rendering data indicative of said first setting in response to said user input.

40. The method of claim 37, wherein each of said second and third images corresponds to said first image.

41. The method of claim 37, wherein said rendering is performed in response to said user input, wherein said third setting corresponds to a second location along said path, and wherein said method further comprises:

sliding said positioning indicator along said path; and positioning said third image at a location corresponding to said second location.

42. The method of claim 37, wherein said path has a first end and a second end, wherein said positioning comprises positioning said second image adjacent to said first end, and wherein said method further comprises positioning said third image adjacent to said second end.

43. The method of claim 42, further comprising:

enabling a user to define a fourth setting of said editing parameter;

rendering a fourth set of said graphical data based on said fourth setting;

displaying a fourth image based on said rendered fourth graphical data set, said fourth image corresponding to said first image;

moving said positioning indicator toward one of said ends; and controlling said fourth setting based on said moving.

44. The method of claim 42, wherein said second setting corresponds to a location along said path that is closer to said first end than a location along said path that corresponds to said third setting.

45. The method of claim 37, further comprising:

determining a new setting of said editing parameter for said first image based on a second user input; and mathematically combining said new setting with pixel color values defining said first image.

46. The method of claim 37, wherein said editing parameter is pixel color parameter.

47. A method, comprising:

rendering a first set of graphical data based on a first setting of an editing parameter;

displaying, within a first graphical window, a first image based on said rendered first graphical data set;

rendering a second graphical window in response to a user input for selecting said editing parameter, said second graphical window including a second image based on a second setting of said editing parameter and a third image based on a third setting of said editing parameter, said second setting different than said third setting thereby enabling a user to comprehend, by visually comparing said second image to said third image, an effect of updating said editing parameter for said first image;

rendering a positioning indicator movable along a path, wherein said second setting corresponds to a first location along said path; and positioning said second image at a location corresponding to said first location.

48. The method of claim 47, further comprising enabling a user to define a fourth setting of said editing parameter via said second graphical window; and updating said first image based on said fourth setting.

49. The method of claim 47, wherein said second graphical window further includes data indicative of said first setting.

50. The method of claim 47, wherein said third setting corresponds to a second location along said path, and wherein said method further comprises positioning said third image at a location corresponding to said second location.

51. The method of claim 47, wherein said positioning indicator is within said second graphical window, wherein said path has a first end and a second end, wherein said positioning comprises positioning said second image adjacent to said first end, and wherein said method further comprises positioning said third image adjacent to said second end.

52. The method of claim 51, further comprising:

enabling a user to define a fourth setting of said editing parameter via said second graphical window;

updating said first image based on said fourth setting;

moving said positioning indicator toward one of said ends; and controlling said fourth setting based on said moving.

53. The method of claim 51, wherein said second setting corresponds to a location along said path that is closer to said first end than a location along said path that corresponds to said third setting.

* * * * *

UNITED STATES PATENT AND TRADEMARK OFFICE
CERTIFICATE OF CORRECTION

PATENT NO. : 6,999,068 B2  Page 1 of 1
APPLICATION NO. : 09/934041
DATED : February 14, 2006
INVENTOR(S) : Robert E. Sobol It is certified that error appears in the above-identified patent and that said Letters Patent is hereby corrected as shown below:

In column 16, line 12, in Claim 28, delete "claim 1" and insert -- claim 27 --, therefor.

In column 16, line 30, in Claim 33, delete "manger" and insert -- manager --, therefor.

In column 18, line 22, in Claim 48, delete "comprising" and insert -- comprising: --, therefor.

Signed and Sealed this

Eleventh Day of August, 2009

David J. Kappos
*Director of the United States Patent and Trademark Office*